(12) United States Patent
Garis

(10) Patent No.: US 10,524,467 B1
(45) Date of Patent: Jan. 7, 2020

(54) TREE STAND ASSEMBLIES AND METHODS OF USE

(71) Applicant: Matthew A Garis, Enid, OK (US)

(72) Inventor: Matthew A Garis, Enid, OK (US)

(*) Notice: Subject to any disclaimer, the term of this patent is extended or adjusted under 35 U.S.C. 154(b) by 0 days.

(21) Appl. No.: 15/864,916

(22) Filed: Jan. 8, 2018

Related U.S. Application Data

(63) Continuation-in-part of application No. 14/988,711, filed on Jan. 5, 2016, now Pat. No. 9,938,734.

(60) Provisional application No. 62/444,249, filed on Jan. 9, 2017.

(51) Int. Cl.
*A01M 31/02* (2006.01)

(52) U.S. Cl.
CPC ............................ *A01M 31/02* (2013.01)

(58) Field of Classification Search
CPC .................................................... A01M 31/02
See application file for complete search history.

(56) References Cited

U.S. PATENT DOCUMENTS

| | | | | |
|---|---|---|---|---|
| 3,347,543 A * | 10/1967 | Zak | ........................... | B63C 5/02 248/354.3 |
| 3,493,080 A * | 2/1970 | Ehlert | ................... | A01M 31/02 182/187 |
| 3,944,279 A * | 3/1976 | Blackstock | ........... | A01M 31/02 182/187 |
| 4,392,627 A * | 7/1983 | van den Broek | ......... | B63C 5/02 248/176.1 |
| 4,468,150 A * | 8/1984 | Price | ......................... | B63C 5/02 114/44 |
| 4,792,130 A * | 12/1988 | Ardent | ...................... | B63C 5/02 269/296 |
| RE33,930 E * | 5/1992 | Ardent | ...................... | B63C 5/02 269/296 |
| 5,363,941 A * | 11/1994 | Richard | ................ | A01M 31/02 108/152 |
| 5,458,215 A * | 10/1995 | Burgin | .................. | A01M 31/02 182/187 |
| RE39,725 E * | 7/2007 | Muhich | ......................... | 182/135 |
| 7,434,662 B2 * | 10/2008 | McFall | ................. | A01M 31/02 182/133 |
| 8,230,972 B2 * | 7/2012 | Johnson | ................ | A01M 31/02 182/187 |
| 8,240,432 B2 * | 8/2012 | Call | ...................... | A01M 31/02 182/133 |
| 8,522,920 B1 * | 9/2013 | Salyer | ................... | A01M 31/02 182/187 |
| 8,752,670 B2 * | 6/2014 | Holman | ................ | A01M 31/02 182/187 |
| 8,926,217 B1 * | 1/2015 | Smith | ....................... | B63C 5/02 248/176.1 |
| 9,938,734 B1 * | 4/2018 | Garis | ...................... | E04G 5/067 |
| 10,015,957 B1 * | 7/2018 | Fast | ...................... | A01M 31/02 |

(Continued)

*Primary Examiner* — Colleen M Chavchavadze
(74) *Attorney, Agent, or Firm* — John M. Behles

(57) ABSTRACT

Tree stand assemblies and methods of use are provided herein. An example assembly or device includes a tree stand seat assembly having a seat portion and a back support portion; a foot stand assembly; a main brace member coupling the seat portion to the foot stand assembly; a first anchor extending from the main brace member; and a second anchor coupled with a linear track disposed on an underside of the foot stand assembly, the second anchor capable of translating along the linear track.

14 Claims, 4 Drawing Sheets

(56) References Cited

U.S. PATENT DOCUMENTS

| | | | | |
|---|---|---|---|---|
| 2011/0226553 A1* | 9/2011 | Ekes, II | ................ | A01M 31/02 182/188 |
| 2011/0297481 A1* | 12/2011 | Copus | ................ | A01M 31/02 182/113 |
| 2012/0168249 A1* | 7/2012 | Furseth | ................ | A01M 31/02 182/113 |
| 2014/0311828 A1* | 10/2014 | Bassett | ................ | A01M 31/02 182/124 |
| 2017/0020125 A1* | 1/2017 | Berry | ................ | A01M 31/02 |

* cited by examiner

TREE STAND ASSEMBLIES AND METHODS OF USE

CROSS REFERENCE TO RELATED APPLICATIONS

This application claims the benefit and priority of U.S. Provisional Application Ser. No. 62/444,249, filed on Jan. 9, 2017, which is hereby incorporated by reference herein in its entirety including all references and appendices cited therein, for all purposes. This application is also a continuation-in-part of U.S. application Ser. No. 14/988,711, filed on Jan. 5, 2016, which is hereby incorporated by reference herein in its entirety including all references and appendices cited therein, for all purposes.

FIELD OF THE INVENTION

The present disclosure pertains to tree mounted assemblies and methods of use. Embodiments of tree mounted assemblies include tree stands that can be coupled to any part of a tree while allowing the tree stand to remain level.

SUMMARY

Various embodiments of the present disclosure are directed to a device, comprising: a tree stand seat assembly comprising a seat portion and a back support portion; a foot stand assembly; a main brace member coupling the seat portion to the foot stand assembly; a first anchor extending from the main brace member; and a second anchor coupled with a linear track disposed on an underside of the foot stand assembly, the second anchor capable of translating along the linear track.

Implementations of the present disclosure can comprise the linear track being integrated as a component of a track frame. Some embodiments include the device where the first anchor comprises an anchor shaft and fork, the fork being configured to engage with a tree. Some embodiments include the device where the anchor shaft of the first anchor comprises a plurality of apertures that allow a positional length of the anchor shaft to be securely selected, and where the anchor shaft is received in a tubular anchor receiver of the main brace member. Some embodiments include the device where the second anchor comprises an anchor shaft and fork, the fork being configured to engage with a tree, and where the anchor shaft of the second anchor comprises a plurality of apertures that allow a positional length of the anchor shaft to be securely selected.

Some embodiments include the device having a tubular sleeve that surrounds the linear track, wherein the second anchor is coupled to the tubular sleeve, and one or more locking members that secure the tubular sleeve in place on the linear track.

Some embodiments include the device that includes a fine tuning adjustment assembly that allows for selectively radial orientation of the fork, as well as selective positioning of the fork from the anchor shaft. The fine tuning adjustment assembly comprises a threaded shaft extending from the fork and a threaded stop that can be selectively located along the threaded shaft to lock in a fine tuned position of the fork relative to the threaded shaft.

Some embodiments include the device with a ladder that is selectively coupled to the foot stand assembly, and where the seat portion and the back support portion hinge relative to one another.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
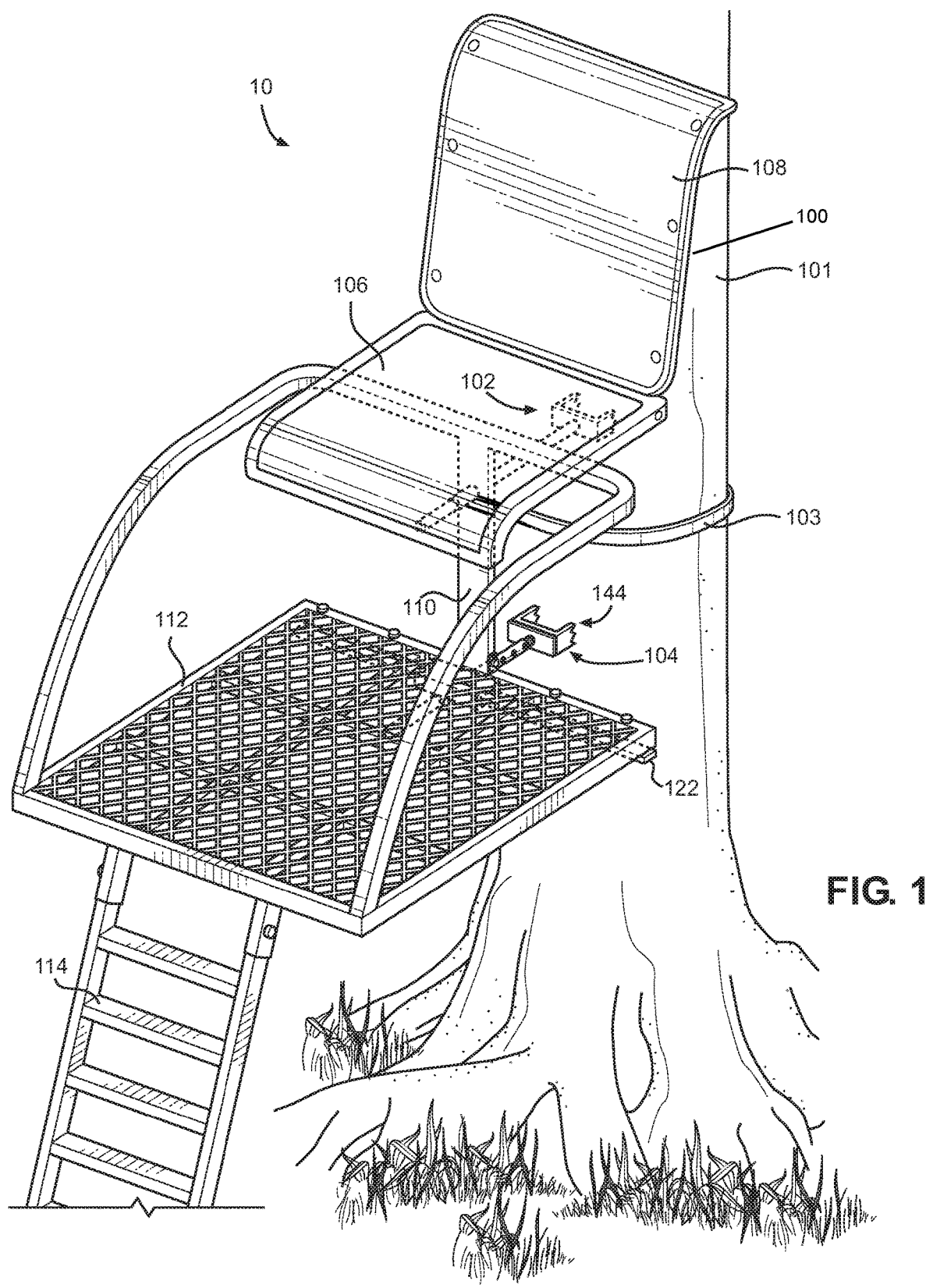
FIG. 1 is a perspective view of an example ladder tree stand in association with a tree.
Figure 2:
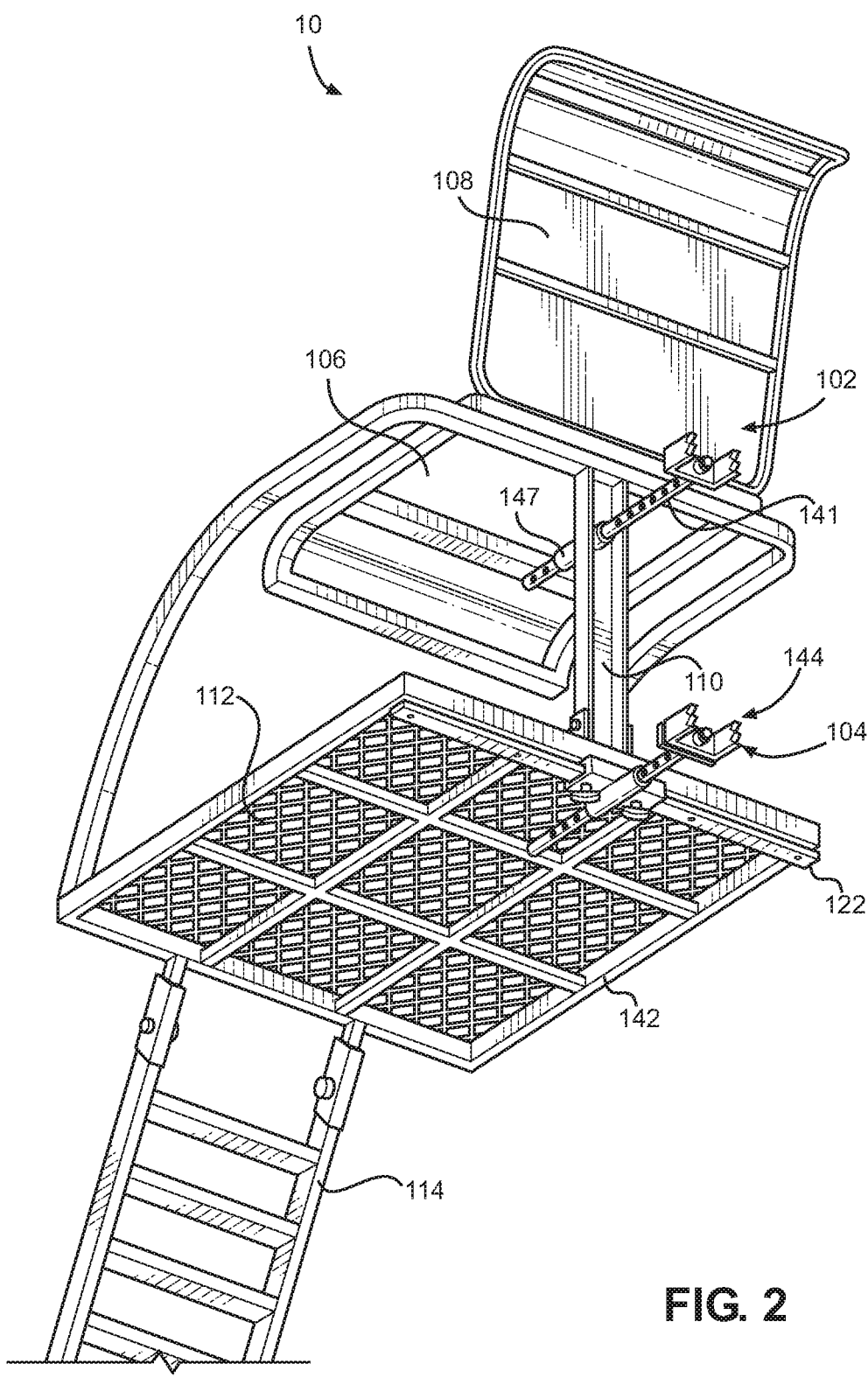
FIG. 2 is a rear perspective view of the example ladder tree stand of FIG. 1.

Generally described, the present disclosure is directed to various tree stands that comprise mounting assemblies that allow for mounting a stand to straight or crooked tree parts, all while the stand remains level to a ground surface. Thus, a stand can be mounted to a tree trunk, whether substantially straight, curved, bent or otherwise shaped. The mounting assemblies can allow the stand to mount to a tree branch that is angled in any direction relative to a ground surface. These and other advantages of the present disclosure are provided below.

FIGS. 1-4 collectively illustrate an example tree stand device 10 in association with a tree trunk 101. The tree stand device 10 comprises a tree stand seat assembly 100 and a pair of mounting assemblies, referred to as anchor 102 and anchor 104. In some embodiments, the tree stand seat 100 comprises a seat portion 106 and a back support portion 108. The tree stand seat 100 is coupled to a main brace 110. In one or more embodiments, the seat portion 106 can be hingedly coupled to the main brace 110. Also, the seat portion 106 can hinge relative to the back support portion 108.

The tree stand device 10 can be secured to the tree trunk 101 using one or more straps, such as strap 103.

The tree stand seat 100 also comprises a foot support portion 112 that is disposed at an opposing of the main brace 110 from the tree stand seat 100. In some embodiments, the foot support portion 112 can hinge relative to the main brace 110. A user can stand on or rest their feet on the foot support portion 112. In some embodiments, the foot support portion 112 is a grid or mesh of metal.

The tree stand seat 100 also comprises both right and left handed railings made from tubular metal. In one embodiment a ladder 114 is coupled to the foot support portion 112.

In one embodiment the pair anchors 102 and 104 are capable of being vertically and horizontally offset from one another. For example, the anchor 102 is located near an upper portion and midline of the tree stand seat 100, while the anchor 104 is located on a lower portion and offset to the left of the midline of the tree stand seat 100.

Top anchor 102 is centered in the stand and will move in and out with a travel distance of approximately twelve inches for positioning the tree stand seat 100 closer or more near the tree. The lower anchor 104 functions similarly and slides side to side (e.g., laterally) with a travel distance of approximately thirty inches to allow for mounting the tree stand seat 100 to match a tree (or parts of a tree) that leans slightly forward or backwards and or side to side.

Each of the anchors, such as anchor 102 and anchor 104 comprises two gripping ends formed as a fork 144 of anchor 104. The fork 144 comprises ends 132 and 134 that extend from an anchor shaft 140. In one embodiment the anchor shaft 140 comprises apertures, such as aperture 146. A positional length (e.g., how far away from the device frame) of the anchor shaft 140 can be set when a fastener is inserted a desired aperture 146, securing the anchor shaft 140 in place.

In more detail, the example device 10 above comprises the tree stand seat assembly 100 comprising a seat portion 106 and a back support portion 108. A main brace member 110 is coupled to the tree stand seat assembly 100. A foot stand assembly 112 (e.g., foot support portion) is coupled to an opposing end of the main brace member 110. This can be a pivoting connection or a static connection in some embodiments.

In some embodiments, a first anchor 102 extends from the main brace member 110, and a second anchor 104 is coupled with a linear track 122 disposed on an underside of the foot stand assembly/portion 112. In some embodiments, the linear track 122 is part of a track frame 142 disposed on an underside of the foot stand assembly 112.

As noted above, each of the anchors 102 and 104 comprise the anchor shaft 140 that comprises a plurality of apertures, such as aperture 146 that allows for selection of a positional length of the anchor shaft. In some embodiments, the anchor shaft 141 of the anchor 102 is received in a tubular anchor receiver 147 of the main brace member 110. The anchor 104 is constructed similarly to the anchor 102, with the exception that anchor 104 is coupled with a tubular sleeve 148 that surrounds the linear track 122. The second anchor 104 is coupled to the tubular sleeve 148 in some instances, using another tubular anchor receiver 150 coupled to the tubular sleeve 148.

In some embodiments, movement of the tubular sleeve 148 along the linear track 122 allows for lateral movement of the anchor 104. The anchor 104 moves linearly so as to allow for the anchor 104 to linearly and vertically align with the anchor 102, as well as allow the anchor 104 to be vertically offset from the anchor 102.

When a desired position of the tubular sleeve 148 and anchor 104 are found, one or more locking members, such as wingnuts 152 and 154 are used to secure the tubular sleeve 148 in place on the linear track 122. That is, the wingnuts have threaded shafts that, when tightened by a user, will lock the tubular sleeve 148 in-place on the linear track 122. Loosening of the wingnuts allow for translation of the tubular sleeve 148 along the linear track 122.

Figure 3:
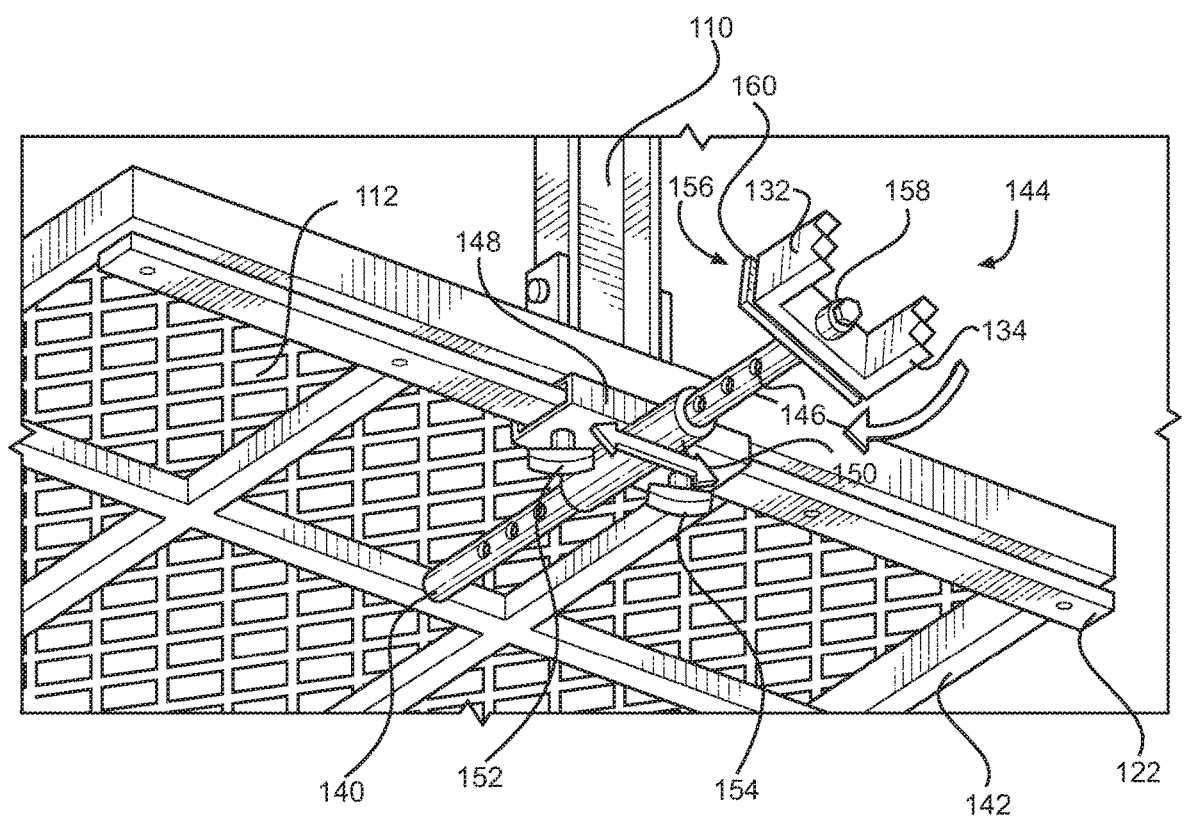
FIG. 3 is a close-up perspective view of a linear track and anchor of the example ladder tree stand of FIGS. 1 and 2.
Figure 4:
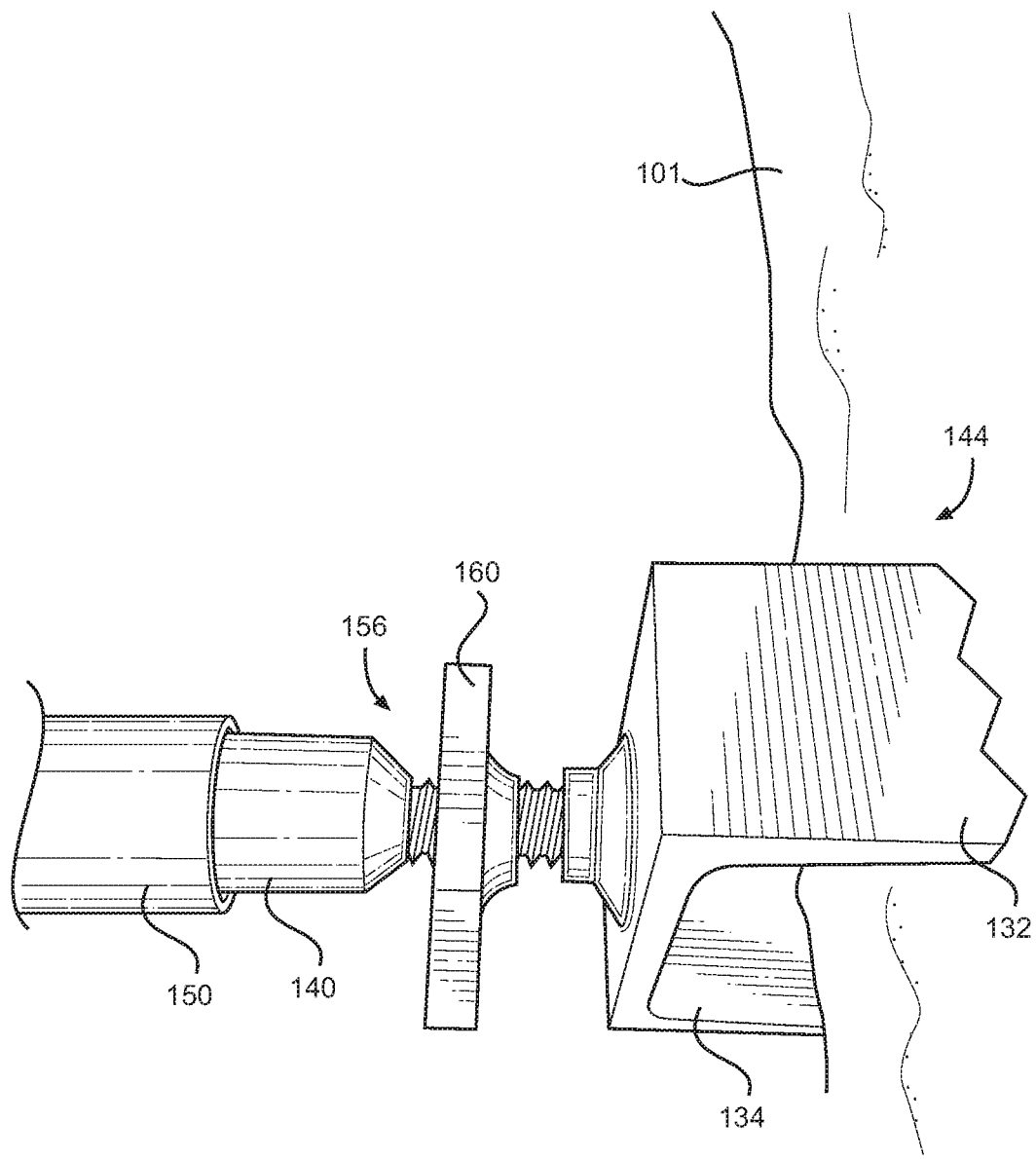
FIG. 4 is a perspective view of an example fine tuning adjustment assembly.

FIGS. 3 and 4 collectively illustrate an example version of a fine tuning adjustment assembly 156 that allows for selectively radial orientation of a fork, such as fork 144 of anchor 104, as well as selective positioning of the fork 144 at a distance from an end of the anchor shaft 140 of the anchor 104. A second end of the anchor shaft 140 is located on the fork 144, allowing the anchor shaft 140 to be secured to the fork 144 using a fastener such as a bolt.

In some embodiments, the fine tuning adjustment assembly 156 comprises a threaded shaft 158 extending from the fork 144 and a threaded stop 160 that can be selectively located along the threaded shaft 158 to lock in a fine tuned position of the fork 144 relative to the threaded shaft 158. The threaded shaft 158 is received in a threaded opening at an end of the anchor shaft 140.

In operation, when a positional location of the anchor shaft 140 is obtained and secured, the a positional location of the fork 144 relative to the end of the anchor shaft 140 can be selected by spinning the fork 144, which causes the threaded shaft 158 to thread into or out of the anchor shaft 140. The threaded stop 160 is positioned between the end of the anchor shaft 140 and the fork 144. Once a positional location of the fork 144 is selected, the fork 144 can be secured in this location by spinning the threaded stop 160 onto the end of the anchor shaft 140. This prevents further rotation of the fork 144 which would drive the threaded shaft 158 further towards the end of the anchor shaft 140.

In some embodiments the threaded stop 160 includes a threaded plate or threaded nut. It will be understood that the fine tuning adjustment assembly allows for selectively radial orientation of the fork 144, as well as selective positioning of the fork 144 relative to the anchor shaft 140. For example, rotation of the fork 144 cause by spinning the threaded shaft 158 relative to the end of the anchor shaft 140 allows for the fork 144 to be oriented at any desired radial position or orientation. When this desired orientation is achieved, the threaded stop 160 is spun down onto the end of the anchor shaft 140, effectively locking the fork 144 in its orientation.

Thus, the fork 144 of anchor 104 is configured to allow for being positioned in a different radial orientation than the fork of the anchor 102 disposed above (see FIG. 1 for anchor 102).

This selective radial orientation allows the fork 144 to contact a tree part that is not straight relative to a ground surface (e.g., a part of the tree that is not perpendicular to the ground surface).

To be sure, the anchor 102 can also comprise a fine tuning adjustment assembly as well.

The present disclosure is now described more fully with reference to the accompanying drawings, in which example embodiments of the present disclosure are shown. The present disclosure may, however, be embodied in many different forms and should not be construed as necessarily being limited to the example embodiments set forth herein. Rather, these example embodiments are provided so that the disclosure is thorough and complete, and fully conveys the concepts of the present disclosure to those skilled in the art. Also, features described with respect to certain example embodiments may be combined in and/or with various other example embodiments. Different aspects and/or elements of example embodiments, as disclosed herein, may be combined in a similar manner. Further, at least some example embodiments may individually and/or collectively be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity, at least as described herein, in any manner, irrespective of the at least one entity have any relationship to the subject matter of the present disclosure.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A device, comprising:
a tree stand seat assembly comprising a seat portion and a back support portion;
a foot stand assembly;
a main brace member coupling the seat portion to the foot stand assembly;
a first anchor extending from the main brace member; and
a second anchor coupled with a linear track disposed on an underside of the foot stand assembly, the second anchor capable of translating along the linear track allowing for translation of the second anchor in a first lateral direction relative to the main brace member, further wherein the second anchor is configured to translate in a second lateral direction relative to the main brace member, the second lateral direction being perpendicular to the first lateral direction.

2. The device according to claim 1, wherein the linear track is integrated as a component of a track frame.

3. The device according to claim 1, wherein the first anchor comprises an anchor shaft and fork, the fork being configured to engage with a tree.

4. The device according to claim 3, wherein the anchor shaft of the first anchor comprises a plurality of apertures that allow a positional length of the anchor shaft to be securely selected.

5. The device according to claim 4, wherein the anchor shaft is received in a tubular anchor receiver of the main brace member.

6. The device according to claim 1, wherein the second anchor comprises an anchor shaft and fork, the fork being configured to engage with a tree.

7. The device according to claim 6, wherein the anchor shaft of the second anchor comprises a plurality of apertures that allow a positional length of the anchor shaft to be securely selected.

8. The device according to claim 7, further comprising a tubular sleeve that surrounds the linear track, wherein the second anchor is coupled to the tubular sleeve.

9. The device according to claim 8, further comprising one or more locking members that secure the tubular sleeve in place on the linear track.

10. The device according to claim 8, further comprising a fine tuning adjustment assembly that allows for selectively radial orientation of the fork, as well as selective positioning of the fork from the anchor shaft.

11. The device according to claim 10, wherein the fine tuning adjustment assembly comprises a threaded shaft extending from the fork and a threaded stop that can be selectively located along the threaded shaft to lock in a fine tuned position of the fork relative to the threaded shaft.

12. The device according to claim 1, further comprising a ladder that is selectively coupled to the foot stand assembly.

13. The device according to claim 1, wherein the seat portion and the back support portion hinge relative to one another.

14. The device according to claim 1, wherein the linear track is perpendicularly oriented relative to an anchor shaft of the second anchor, the anchor shaft providing the translation in the second lateral direction.

* * * * *